June 23, 1964
A. H. BEEN
3,137,983
COTTON HARVESTING MACHINE
Filed Oct. 4, 1960
5 Sheets-Sheet 2
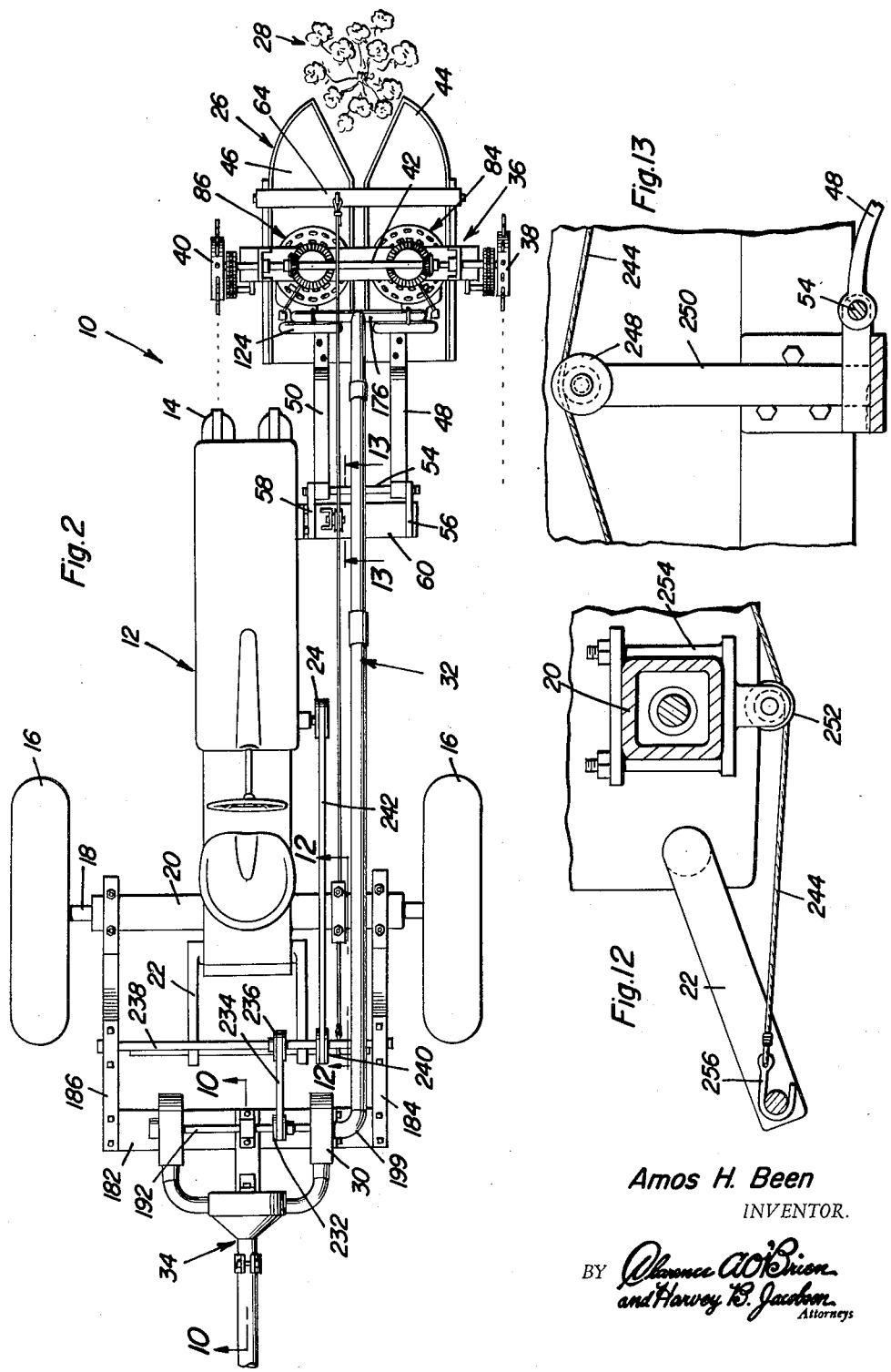
Amos H. Been
INVENTOR.
BY Clarence A. O'Brien
and Harvey B. Jacobson
Attorneys

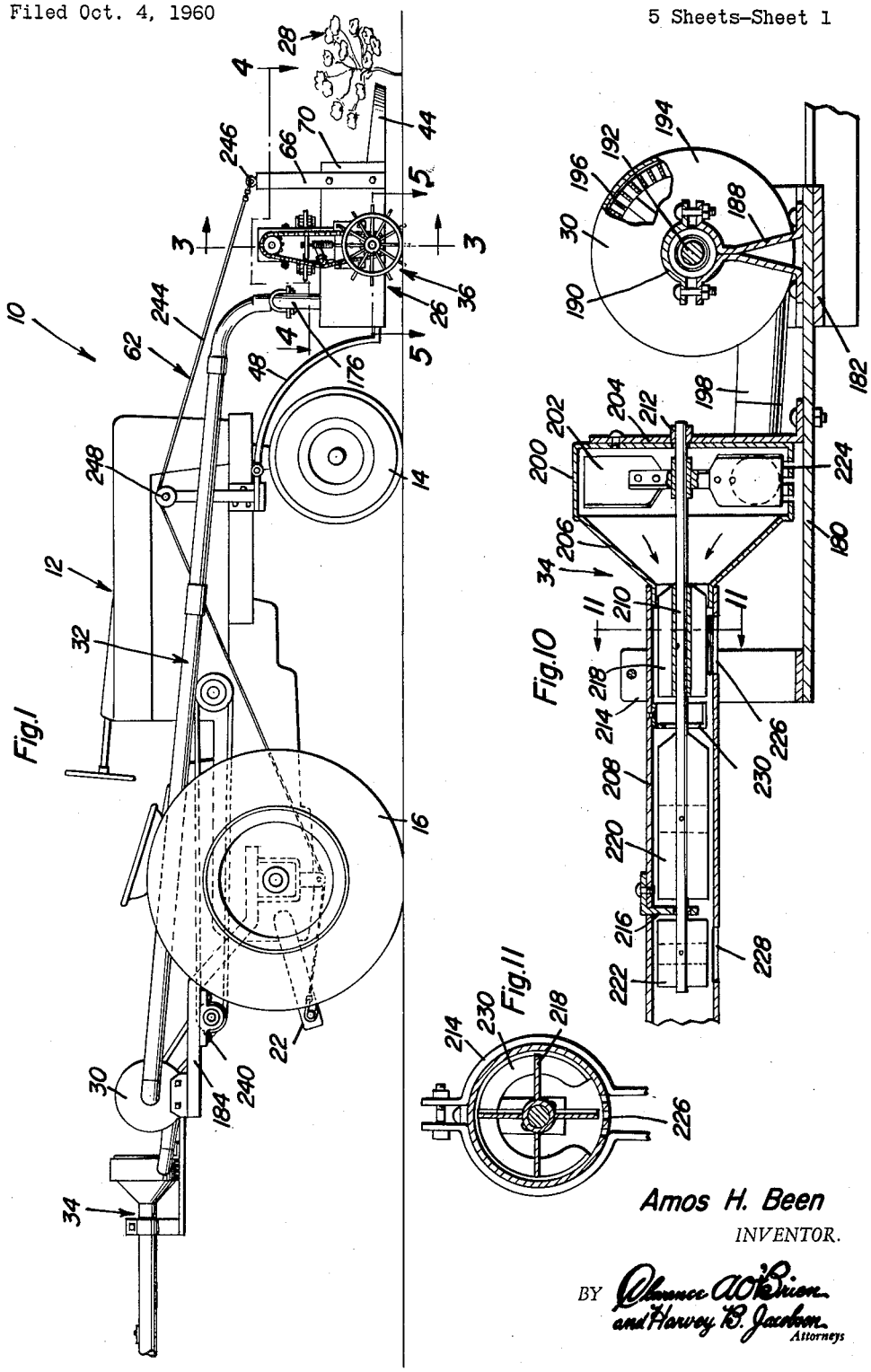

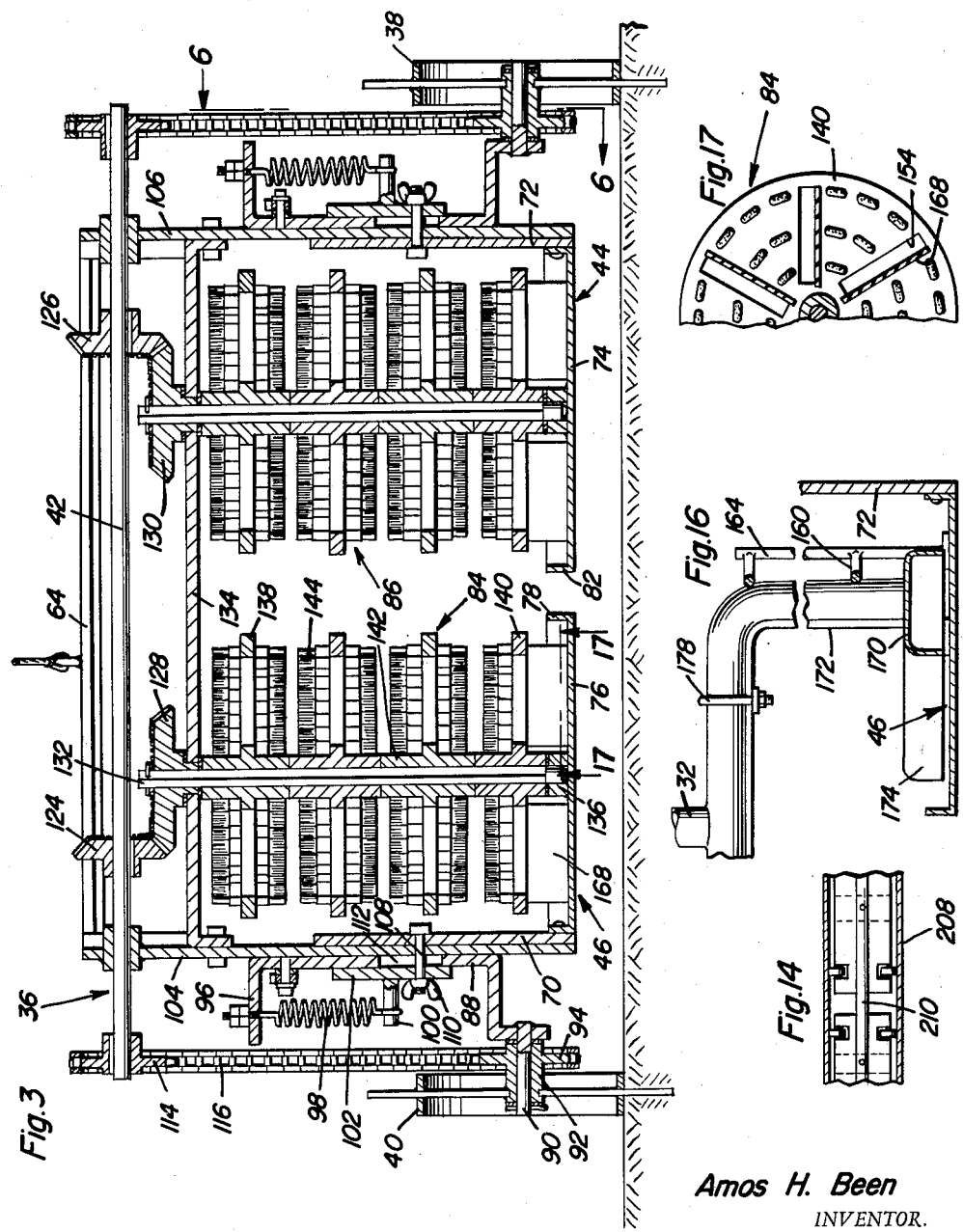

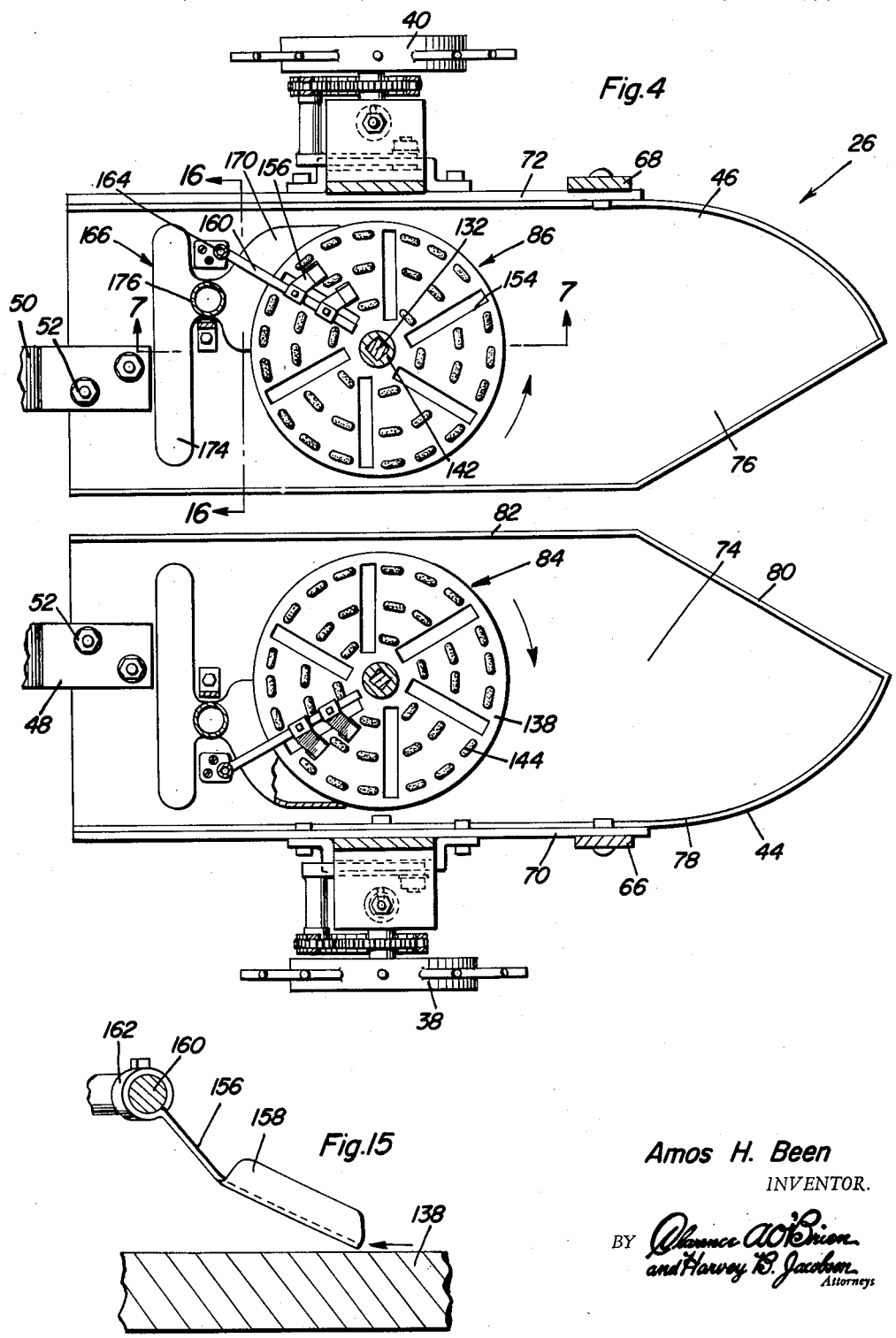

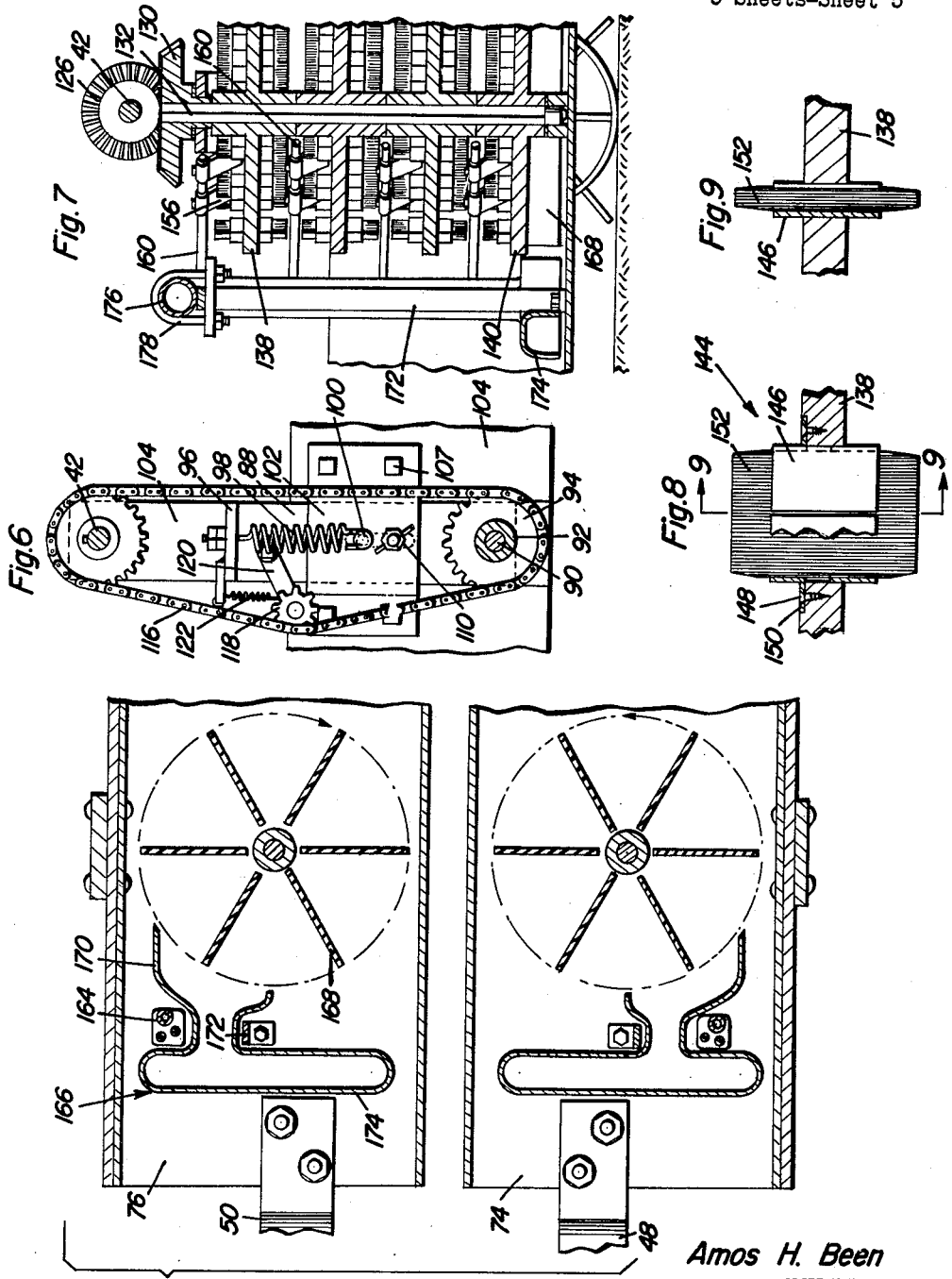

United States Patent Office 3,137,983
Patented June 23, 1964

3,137,983
COTTON HARVESTING MACHINE
Amos H. Been, R.R. 1, Box 397, Henryetta, Okla.
Filed Oct. 4, 1960, Ser. No. 60,376
10 Claims. (Cl. 56—48)

This invention relates to a cotton harvesting machine mounted on a tractor-type vehicle and is a continuation-in-part of my prior co-pending application Serial No. 832,410, now abandoned, having a completed filing date of August 7, 1959.

The cotton harvesting machine of this invention is adapted to be mounted on a tractor-type vehicle although not necessarily restricted thereto. When mounted on the tractor vehicle, the harvesting machine presents either a single or a plurality of forwardly mounted cotton picking units arranged in alignment with the rows of cotton plants between which the wheels of the tractor vehicle pass so that the cotton on the plants may be removed by the cotton picking unit. The harvester machine of this invention therefore includes novel cotton picking units which gently comb the cotton from the plant by means of brushes without otherwise damaging the cotton plant stem or removing other undesirable matter from the plants. A novel suction nozzle and cotton collection arrangement is associated with each cotton picking unit so as to receive the cotton removed from the plant and direct it into a conveyor tube to which suction is applied. Accordingly, a suction generating device is disposed at the rear portion of the tractor vehicle when the harvesting machine is mounted on a tractor vehicle not only to more conveniently be drivingly connected to the tractor vehicle power take-off for drive of the suction generating device at a higher speed but also to cooperate with a cleaning device through which the suction generating device discharges the cotton before the cotton is delivered to a wagon trailing behind the tractor vehicle. The cleaning device of this invention therefore involves a novel arrangement wherein the discharge of the suction generating means impels or causes rotation of the cleaning device for performing its function in removing trash and other debris from the cotton. The harvesting machine also features a cable lift mechanism powered by the hydraulic mechanism on the tractor which may pivotally raise the cotton picking unit hingedly mounted at the forward end of the tractor upwardly out of operative position when so desired. Also, the operating drive for the cotton picking unit is derived from the forward motion of the tractor vehicle or harvesting machine itself over the ground. The cotton picking units are therefore supported a predetermined spaced distance above the ground by the drive mechanism therefor and may be selectively conditioned for either yieldable support or rigid support above the ground depending upon the type of picking operation called for.

It is therefore a primary object of this invention to provide a cotton harvesting machine which will pick the cotton, convey it to the rear of the machine and clean the cotton prior to delivery thereof to a trailing collection wagon.

Another object of this invention in accordance with the foregoing object is to provide a cotton harvesting machine performing the above stated functions in a more efficient manner.

A still further object of this invention is to provide a harvesting machine for cotton which will gently remove cotton from the cotton plant rather than stripping the plant as was heretofore done so as to more cleanly remove cotton from the plant which may be subsequently cleaned by a cleaning device operative to sufficiently clean the cotton in a more efficient manner and with a minimum of parts and effort.

An additional object of this invention is to provide a cotton harvesting machine which features cotton picking units which gently remove cotton from plants by a novel brushing action uniquely arranged in relation to suction nozzle mechanisms for conveying the cotton to the suction generating mechanism to which the suction nozzle mechanism is connected with suction generating mechanism is also effective to operate a cleaning device into which the cotton is discharged.

Another object of this invention is to provide a cotton picking machine which is so efficiently arranged with respect to a tractor vehicle on which it is mounted as to provide an effectively and economically operative cotton harvesting machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the cotton harvesting machine mounted on a tractor in accordance with this invention.

FIGURE 2 is a top plan view of the cotton harvesting machine illustrated in FIGURE 1.

FIGURE 3 is a sectional view taken substantially through a plane indicated by section line 3—3 in FIGURE 1.

FIGURE 4 is a sectional view taken substantially through a plane indicated by section line 4—4 of FIGURE 1.

FIGURE 5 is a sectional view taken through a plane indicated substantially by section line 5—5 in FIGURE 1.

FIGURE 6 is a partial sectional view taken through a plane indicated by section line 6—6 in FIGURE 3.

FIGURE 7 is a sectional view taken through a plane indicated by section line 7—7 in FIGURE 4.

FIGURE 8 is a partial break-away sectional view of a brush element constructed in accordance with this invention.

FIGURE 9 is a sectional view taken through a plane indicated by section line 9—9 in FIGURE 8.

FIGURE 10 is a sectional view taken through a plane indicated by section line 10—10 in FIGURE 2.

FIGURE 11 is a sectional view taken through a plane indicated by section line 11—11 in FIGURE 10.

FIGURE 12 is a part of a sectional view taken through a plane indicated by section line 12—12 in FIGURE 2.

FIGURE 13 is a part of a sectional view taken through a plane indicated by section line 13—13 in FIGURE 2.

FIGURE 14 is a partial sectional view showing a modified construction of the arrangement illustrated in FIGURE 10.

FIGURE 15 is a fragmentary sectional view illustrating a baffle element of the cotton picking portion of the cotton picking harvester machine.

FIGURE 16 is a partial sectional view taken substantially through a plane indicated by section line 16—16 in FIGURE 4.

FIGURE 17 is a partial sectional view taken through a plane indicated by section line 17—17 in FIGURE 3.

Referring now to the drawings in detail, FIGURES 1 and 2 illustrate more completely the entire cotton harvesting machine which is generally designated by reference numeral 10. It will therefore be observed that the harvesting machine is mounted on a tractor-type vehicle 12 of conventional design which includes a pair of closely spaced steering wheels 14 at the forward end of the tractor 12 arranged to pass between adjacent rows of cotton plants as the tractor moves through the field. The tractor also includes a pair of rear and more widely spaced large wheels 16 arranged to straddle a pair of adjacent cotton plant rows, the wheels 16 being mounted at the ends of an axle 18 rotatably mounted within the axle tube 20 laterally extending in the usual manner from either side of the tractor chassis. It will also be observed that the tractor vehicle 12 includes at the rear thereof a pair of hydraulically operated arms 22 which may be utilized in a manner as will hereafter be explained. Also, extending laterally from one side of the tractor vehicle 12 is a power take-off pulley wheel 24. The foregoing description with regard to the tractor vehicle 12 represents conventional equipment available to all. However, the novelty of this invention includes as a part thereof an arrangement of parts and operative relationship of machine components which cooperate with the foregoing tractor vehicle equipment to produce the novel and advantageous cotton harvesting machine of this invention.

Further observing the arrangement illustrated in FIGURES 1 and 2, a cotton picking unit generally designated by reference numeral 26 is shown hingedly mounted by the tractor vehicle adjacent the forward end thereof, the cotton picking unit extending forwardly therefrom in alignment with a cotton plant row of which the illustrated cotton plant 28 is part. Mounted rearwardly of the tractor vehicle are a pair of suction generating mechanisms 30 one of which is operatively connected with the cotton picking unit 26 by means of a conveyor tube or conduit means generally indicated by reference numeral 32 which conveyor tube is disposed on one lateral side of the tractor vehicle. It will be observed in connection with the suction generating mechanism 30 that the power take-off pulley 24 is drivingly connected to the suction generating mechanism 30 as will be hereafter explained with greater detail for the purpose of inducing flow of air or fluid in order to withdraw cotton from the picking units, transfer the cotton to a cleaning device 34 and produce an impelling flow of fluid to operate the cleaning device. One of the suction generating mechanisms 30 is therefore connected on one lateral side to the cotton conveyor tube 32 while the mechanism 30 is also connected at a tangential or peripheral portion thereof to the cotton cleaning device generally indicated by reference numeral 34 through which the cotton from the suction generating mechanism is discharged. In regards to the illustrated cotton picking unit 26, it will be understood that although a single unit 26 is illustrated, another unit 26 may be mounted from the other lateral side of the tractor vehicle 12 in alignment with the illustrated unit 26 and in alignment with the adjacent plant row on the other side of the tractor vehicle 12 from the row in which plant 28 is disposed. Furthermore, it should be understood that any number of such cotton picking units may be mounted from the lateral sides of the tractor vehicle in transverse alignment with each other in which case the drive mechanism generally indicated by reference numeral 36 for each of the cotton picking units 26 will be interconnected for drive of all of the units in common. For example, in FIGURE 2, the drive mechanism 36 for the unit 26 includes a pair of ground engaging wheels including an outer spoked wheel 38 and an inner spoked wheel 40. The wheels 38 and 40 are drivingly connected to a drive shaft 42 of the drive mechanism 36. Accordingly, if a second cotton picking unit were to be mounted from the other side of the tractor vehicle 12, the inner spoked wheels thereof may be dispensed with as well as the driving connections between said inner spoked wheel and the drive shaft 42. In such a case, a single common drive shaft 42 may be provided for both of the drive mechanisms 36 of the cotton picking unit with only the two outer ground engaging wheels thereof remaining. Similarly, for any number of cotton picking units to be utilized pursuant to this invention, the units may be ganged by interconnecting the drive shafts thereof leaving only the outer ground engaging wheels of the two outermost units to provide the rotating power for the cotton picking units. Of course, other ganging arrangements may be resorted to as will be familiar to those skilled in the art. The following description however will be made, for exemplary purposes only, with respect to the single unit 26 illustrated.

FIGURES 3 through 9, 15 and 16 illustrate more particularly the details of the cotton picking unit 26. In FIGURES 2 and 4, it will be observed that the cotton picking unit 26 includes plant receiving guide means consisting of a pair of runner members 44 and 46 respectively mounted by means of arch connecting members 48 and 50 to the tractor vehicle 12. The connecting members 48 and 50 are secured as by a plurality of fasteners 52 to the rear portions of the runner members 44 and 46. The other ends of the connecting members are hingedly mounted by a hinge bolt 54 which is disposed between a pair of spaced hinge brackets 56 and 58 fastened to a laterally projecting mounting member 60 which is fastened to the side of the tractor vehicle chassis frame. It will therefore be apparent that the runner members 44 and 46 hingedly mounted as hereinabove described may be raised upwardly from the position illustrated in FIGURE 1 into an inoperative position when desired. Cable mechanism generally indicated by reference numeral 62 is therefore provided for such purpose which mechanism 62 will be hereafter described in greater detail. For the present, however, it will be observed that the cable mechanism 62 is connected at one end to a cross member 64 having downwardly depending end portions 66 and 68 fastened to the side panels 70 and 72 respectively adjacent the forward ends thereof. The side panels 70 and 72 are respectively connected to the outer sides of the runner members 44 and 46 whereby the entire cotton picking unit 26 may be pivotally raised by virtue of the connection to the cable mechanism 62 hereinbefore mentioned. It will therefore be appreciated that the runner members 44 and 46 which include bottom members 74 and 76 respectively are fastened to the side panel members 70 and 72 by means of a peripheral rim 78 disposed about each of the runner members 44 and 46 except for the rear ends of the runner members from which the connecting members 48 and 50 extend. It will be observed that an inwardly tapering channel portion 80 is formed between the rims of the runner members at the forward ends thereof for the purpose of guidingly receiving the cotton plant 28 for relative movement into the narrower channel 82 formed between the intermediate inner portions of the runner members 44 and 46. Accordingly, the runner members rotatably mount intermediate the forward and rear ends thereof oppositely rotating cotton stripping mechanism 84 and 86 each of which is of similar construction. The drive mechanism 36 hereinbefore mentioned is therefore provided for operating the cotton stripping mechanism 84 and 86. Referring therefore to FIGURE 3 in particular it will be observed that the drive mechanism 36 supports the runner members and the mechanism assembled thereon in spaced relation above the ground. Accordingly, the drive mechanism includes a pair of supporting bracket members 88 disposed on either side of the runner members. Mounted at the lower ends of the supporting bracket members 88 are axle bolt members 90 upon which the hub 92 for the ground engaging wheels 38 and 40 are rotatably mounted. Fixed to the ground engaging wheel hub 92 are sprocket wheels 94. Accordingly, the supporting bracket members 88 will be vertically spaced above the ground by means of the ground engaging wheels 38 and 40. Suspended from the top portion 96 of the supporting bracket 88 are spring members 98. The lower ends of the springs 98 are connected to an extension 100 which is fastened to an adjustment plate member 102. The adjustment plate member 102 is secured to the side panel members 70 and 72 to which the runner members 44 and 46 are respectively connected by means of mounting plate members 104 and 106 disposed on the outside of the runner members 44 and 46. The mounting plate members are secured to the adjustment plate members 102 by means of fasteners 107 as seen in FIGURE 6. Bolt members 108 are slidably received within a slot 112 in the supporting bracket member 88 so that upon loosening of the wing nut 110 thereon, slidable adjustment of the supporting bracket members 88 may be effected in a vertical direction relative to the runner members 44 and 46. Accordingly, the runner members with the mechanisms supported thereon are yieldably suspended by springs 98 from the bracket members 88 in spaced relation to the ground surface. When it is desired however, to rigidly support the runner members in spaced position above the ground it will only be necessary to tighten the wing nuts 110 rigidly holding the runner members and plates connected thereto clamped to the bracket supporting members 88.

Referring now to FIGURE 6 in particular it will be observed that the drive shaft 42 is mounted at the top of the mounting plate members 104 and 106. Connected to the outer ends of the drive shaft 42 are a pair of drive sprocket wheels 114 which are drivingly connected to the sprocket wheel 94 connected to the spoke ground engaging wheels by means of an endless chain belt 116. Inasmuch as the distance between the shaft 42 and the ground engaging wheel shaft 90 may vary when the runner members are yieldingly supported, a belt tensioner device is provided in order to maintain the belt 106 under proper driving tension at all times. Accordingly, an idler sprocket wheel 118 is rotatably mounted at the end of a pivoted arm 120 which is spring biased in a clockwise direction as seen in FIGURE 6 by means of the spring 122 anchored between the arm 120 and the top portion 96 of the supporting bracket member 88. The idler sprocket wheel 118 being in engagement with the chain belt 116 will therefore always maintain the belt under proper driving tension.

From the foregoing description, it will therefore be apparent that under all conditions the driving engaging wheels 38 and 40 will impart rotation to the driving shaft 42 for operation of the cotton stripping mechanisms 84 and 86. A pair of spaced bevel gears 124 and 126 as more clearly seen in FIGURE 3 are therefore fixed to the drive shaft 42 and mesh respectively with the bevel gears 128 and 130 which are fixed to an upper end of a pair of squared or non-circular shafts 132 provided for each of the cotton stripping mechanisms 84 and 86. Accordingly, a top supporting plate member 134 is secured between the mounting plate members 104 and 106 for rotatably supporting the drive bevel gears 128 and 130 for the cotton stripping mechanisms 84 and 86. Also, journal bearings 136 are disposed on the bottom members 74 and 76 of the runners 44 and 46 respectively in axial alignment with the drive bevel gears 128 and 130 for journalling the lower ends of the shafts 132 therein. As a result thereof, opposite rotational movement may be imparted by forward movement of the cotton picking unit 26 to the cotton stripping mechanisms 84 and 86.

Referring again to FIGURE 3 it will be observed, that disposed between the top plate member 134 and each of the bottom members of the runner members are a plurality of spaced disk members 138 with the bottom disk member being designated as 140. It will also be observed that each of the disk members includes a hub 142 which extends axially in either direction beyond the disk portion of the disk member in order to maintain the disk member 138 in vertically spaced relation to the adjacent disk member. It will also be observed that the internal bore of the hub 142 conforms to the cross-sectional configuration of the non-circular shaft member 132 so that drive imparted to the shaft 132 may be transmitted to the disk 138 and 140. Referring now to FIGURE 4 in particular, it will be observed that each disk 138 has mounted thereon a plurality of brush elements 144 which are arranged on the disk member 138 in both circumferentially spaced positions and radially spaced positions. Also referring to FIGURES 8 and 9 it will be observed that each of the brush elements 144 extends axially above and below the disk members 138 on which it is mounted. A clamping sleeve 146 of the brush element 144 is anchored by fasteners 148 connecting projecting portions 150 from the clamp element 146 onto the top surface of the disk member 138. The clamp member 146 is oblong in cross section and retains therein a bundle of bristles 152 forming the brush element with the projecting ends thereof tapering inwardly as seen from FIGURES 8 and 9. It will also be observed from FIGURES 3, 4 and 7 that cotton collection means is associated with the disk members including openings 154 in the disk members forming restrictive passages through which the cotton may fall to the floor 74 or 76 of the runner members 44 or 46 or be withdrawn. Accordingly, each of the disk members 138 as well as the bottom disk member 140 will have the openings 154 thereof aligned with each other. It will also be observed that the cotton collection means includes pairs of baffle members 156 disposed in fixed relation to the runner members above each of the disk members 138 as well as above the disk member 140. The baffle members are disposed between the circumferential sets of brush elements 144 and rest on the surface of the disk member 138 so that the disk member top surface will move relative to the baffle member 156 as more clearly seen in FIGURE 15. The baffle members are bent as seen in FIGURE 15 and include side portions 158 by means of which cotton may accumulate thereon as the baffle elements 156 hold or retain the cotton adhering to the brush elements which cotton has been stripped by the brush elements as they rotate past the channel portion 82 of the runner members 44 and 46 within which channel 82 the cotton plants pass as the cotton picking unit 26 moves forwardly through the plant rows. A plurality of vertically spaced horizontal rods 160 are therefore provided to which the baffle members 156 are connected by sleeve portions 162. The vertically spaced horizontal rods 162 are connected to a vertical post 164 appropriately anchored to the floor 76 or 74 of the runner members 44 and 46. The baffle members 156 therefore cooperate with each of the disk members 138 and 140 so as to push the cotton from the brush elements 144 into the openings 154 as they pass under the baffle elements 156. The baffle elements 156 are therefore so positioned on top of the disk members so as to cooperate with the opening 154 at an angular position so as to best take advantage of a suction nozzle structure generally indicated by reference numerals 166 as more clearly seen from FIGURES 4, 5, 6, 7 and 16 in order to restrictively expose the accumulated cotton to the suction pressure by means of the passages formed by the openings 154.

In connection with the suction nozzle structure the bottom disk member 140 differs from the other disk members 138 in that attached to the bottom surface thereof are a plurality of flexible sweeper elements 168 which project downwardly into contact with the floor 74 or 76 of the runner members 44 and 46. It will also be observed therefore that the nozzle structure 166 as seen in FIGURE 5 includes a portion 170 the opening of which is disposed in peripheral adjacency to the disk member 140 so that the sweep elements 168 may volumetrically control air flow between the openings 154 and the suction nozzle portion 170 in accordance with the rotational speed of the cotton removing mechanisms 84 and 86 so as to control the suction pressure necessary for withdrawing cotton through the openings 154. With regard to the location of the openings 154, they will be angularly disposed just behind each sweeper element 168, as more clearly seen in FIGURE 17. It will therefore be apparent that the nozzle portion 170 applying suction between the sweeper element 168 to the openings 154 on each of the disk members, withdraws therethrough the cotton collected upon the baffle elements 156 to thereby continuously remove the cotton clinging to the brush elements 144 with a suction pressure controlled in accordance with the rate of collection as governed by the speed of the harvester vehicle. The nozzle portion 170 is supported just above the floor of the runner member by means of strap member 172 suitably anchored to the floor of the runner member. Also connected rearwardly of the nozzle portion 170 is an elongate transversely extending nozzle portion 174 which is disposed rearwardly of the nozzle portion 170 so that the cotton falling from the openings 154 not received within the nozzle portion 170 may be received by the nozzle portion 174. A tubular conduit 176 is therefore connected between the nozzle portions 170 and 174 of each of the nozzle structures 166 associated with each of the cotton removal mechanisms 84 and 86. From FIGURES 2 and 16 therefore it will be seen that the conveyor tube 32 may apply suction to the conduit 176 and the nozzle structure 166 associated with each of the cotton removal mechanisms 84 and 86. It will also be seen from FIGURES 7 and 16 that the nozzle supporting strap member 172 which is suitably anchored to the floor of the runner member supports the conduit 176 in spaced relation thereto and is connected thereto by means of U bolts 178.

The suction applied to the nozzle structures 166 through the conduit 176 as was hereinbefore indicated, is accomplished through the conveyor tube 32 which also conveys the cotton therethrough to the suction generating mechanism 30. As more clearly seen in FIGURE 10, the suction generating mechanism is mounted on a rearwardly extending member 180 which in turn is mounted on a cross member 182 supported between a pair of rearwardly extending frame members 184 and 186 which are bolted at a forward end to the axle tube 20 of the tractor vehicle as more clearly seen in FIGURE 2. A mounting bracket 188 is therefore bolted to the member 180 which cooperates with a top journal section 190 to rotatably mount the drive shaft 192 for the suction generating mechanisms 30. The mechanisms 30 are constituted by a fan disposed within the drum casing 194 having radially disposed blades 196 for impelling both the air and cotton out of a delivery conduit 198 tangentially connected to the bottom for example of the drum casing 194. The inlet 199 of the suction generating mechanism 30 which is connected to the conveyor tube 32 delivers the cotton axially to one side of the mechanism 30 as more clearly seen in FIGURE 2. It will therefore be appreciated that the fan mechanism 30 not only discharges the cotton therefrom through the conduits 198 but also pumps air therethrough under a velocity head. Accordingly, the cotton is not only delivered to the cleaning device 34 but also motive power is supplied thereto. Accordingly, the delivery conduit 198 is connected adjacent a peripheral portion of an impeller blade casing 200 of cylindrical configuration within which is disposed radially arranged and appropriately angled impeller blade 202. The casing 200 is also mounted in proper position on the mounting member 180 by means of the mounting bracket member 204. Telescopically received over a conical connecting section 206 is a delivery conduit 208, said conical section 206 being connected to the exit side of the impeller blade 202. Air as well as cotton is accordingly discharged into a more restrictive conduit 208 from the casing 200 so as to increase the velocity thereof due to the converging passage as well as to retard movement of the cotton. It will be understood that a portion of the velocity head of the air discharged from the conduit 198 into the casing 200 will have been utilized to impart rotation to the blades 202 and to the cleaner drive shaft 210 to which the blade 202 is connected. Accordingly, the drive shaft 210 is rotatably mounted at one end through the casing 200 in the bracket 204 by journal sleeve bearing 212 and at another end within the conduit 208. Conduit 208 is supported in axial alignment with casing 200 by means of clamp bracket 214 and includes the inwardly projecting journal member 216 for the drive shaft 210. An alternative arrangement for journalling the drive shaft 210 within the conduit 208 is illustrated in FIGURE 14 wherein the agitator blades have rotatably mounted adjacent the peripheral portions thereof and in spaced relation to each other, a plurality of rollers which engage the inside walls of the conduit 208. Returning therefore to the illustration in FIGURE 10 it will be observed that a plurality of spaced agitator blades 218, 220 and 222 are fixed to the drive shaft 210 for rotation therewith. Accordingly, the cotton being impelled through the delivery tube 208 is further agitated by the blades 218, 220 and 222 to remove therefrom the debris, trash, seeds, etc. It will be observed that apertures 224 are provided at the bottom of the casing 200 while slotted apertures 226 and 228 are disposed axially spaced and below the blades within the delivery conduit 208 at the bottom thereof so that the debris may drop therefrom as the cotton passes therealong. Also, as seen from FIGURES 10 and 11, between blade 218 and 220 a retarding baffle member 230 is disposed in order to further retard axial movement of the cotton insuring complete agitation and cleaning thereof by the agitator blades. It will therefore be appreciated that the suction generating mechanisms 30 not only withdraw the cotton from the cotton picking unit 26 by suction applied thereto but also utilize the pressure discharged therefrom to operate the cleaning device 34. The cleaned cotton may therefore leave the conduit 208 for deposit within a trailing wagon for collecting the cotton from the harvesting machine. The only powered drive necessary for the harvesting machine will therefore be applied to the suction generating fan mechanism 30.

It will therefore be observed that the drive shaft 192 for the fan mechanism 30 has fixed thereto as seen in FIGURE 2 a drive pulley 232. The drive pulley is belt connected by belt 234 to a pulley wheel 236 fixed to an intermediate shaft 238 journalled by journal brackets 240 mounted below the frame member 184 and 186 as seen for example in FIGURE 1. The shaft 238 in turn is drive connected by means of pulley 240 and belt 242 to the power take-off pulley 24. Accordingly, a high speed drive may be imparted to the drive shaft 192 for the fan mechanism 30.

As was hereinbefore indicated, the cotton picking unit 26 may be pivotally raised about its pivot bolt 54 by means of the cable mechanism 62. It will therefore be observed from FIGURE 1, that the cable mechanism includes a cable 244 connected at one end to the member 66 by means of eye bolts 246. The cable is guided by an idler pulley 248 mounted on top of a mounting arm 250 secured to the side of the tractor as more clearly seen in FIGURE 13. The cable 244 then extends downwardly from the idler pulley 248 and is trained below a second idler pulley 252 rotatably mounted at the bottom of a mounting bracket member 254 suitably bolted to the axle tube 20 of the tractor vehicle as more clearly seen in FIGURE 12. The other end of the cable 244 is therefore connected by hook member 256 to the hydraulic lift arm 22. Accordingly, by operator control of the tractor hydraulic mechanism, the hydraulic lift arms 22 may be rotated in a clockwise direction as viewed in FIGURE 12 to thereby apply tension to the cable 244 and pivotally raise the cotton picking unit 26 out of operative position above the ground. The tractor vehicle may then be readily turned for making another row traverse across a cotton field. Thus, the runners and the cotton stripping assemblies mounted thereon may be selectively conditioned for yieldable support above the ground in both operative and inoperative positions.

From the foregoing description operation and utility of the cotton harvesting machine made in accordance with this invention will be apparent. It will therefore be appreciated by those skilled in the art that a novel cotton removing mechanism 26 and cotton cleaning device 34 are operatively related to each other in a unique manner to produce a highly efficient cotton harvesting machine with a minimum of parts which contribute to a machine which may be economically manufactured and have a low operating expense. It will also be noted that the unused suction fan mechanism 30 illustrated in FIGURE 2 may conveniently be connected to a cotton picking unit when installed on the other side of the tractor vehicle as hereinbefore contemplated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a tractor vehicle, a cotton harvesting machine comprising, plant receiving guide means mounted forwardly of the vehicle and projecting forwardly therefrom in alignment with plant rows, cotton picking brush means rotatably mounted on the guide means for removal of cotton from the plants in response to forward movement of the vehicle, cotton collection means operatively coacting with the rotating brush means on the guide means for removing cotton from the brush means, suction nozzle means operatively mounted on the guide means and rendered operative to withdrawn cotton accumulated in the collection means and the guide means, suction generating means operatively mounted rearwardly of the vehicle, conduit means operatively connected between said suction generating means and said nozzle means to render the nozzle means operative and convey cotton withdrawn thereby and cotton cleaning means operatively connected to the suction generating means and rendered operative thereby for receiving cotton from the suction generating means and removing impurities before delivering the cotton rearwardly of the vehicle.

2. In combination with a tractor vehicle, a cotton harvesting machine comprising, cotton picking means mounted forwardly of the vehicle for engagement with cotton plants in spaced relation to the stems thereof, rotatable cotton cleaning means mounted rearwardly of the vehicle, fluid flow conveying means mounted on the vehicle and operatively connected to the cotton picking means and the cleaning means to withdraw and convey cotton from the picking means to the cleaning means and rotate the cleaning means for delivery of cleaned cotton rearwardly of the vehicle and means mounted on the cotton picking means in operative relation to the fluid flow conveying means for controlling withdrawal of cotton in accordance with forward movement of the vehicle.

3. The combination as defined in claim 1 including drive means operatively connected to the brush means for rotation of the brush means in response to forward movement of the vehicle.

4. The combination of claim 2, wherein said cotton picking means comprises a pair of guide runner means for receiving plant stems therebetween, rotatable disk means mounted on each runner means, a plurality of brush means mounted on the disk means for combing the branches of the cotton plants in spaced relation to the stems for removing cotton therefrom, baffle means mounted on the runner means and disposed between the brush means for accumulating cotton thereon from the brush means, opening means on the disk means to form a passage for removal of cotton accumulated on the baffle means, suction nozzle means operatively positioned on the runner means relative to the disk means for applying suction through the opening means in response to operation of said cleaning means and under speed control of the rotatable disk means to withdraw cotton through the opening means from the baffle means.

5. The combination of claim 4, wherein said suction nozzle means is operatively connected to suction generating means by the cotton conveying means which includes a cotton conveyor tube, said suction generating means discharging into a delivery conduit connected to the cotton cleaning means for operation thereof.

6. The combination of claim 5 wherein said cotton cleaning means comprises, radial impeller blade means, casing means disposed about said impeller blade means and connected adjacent a peripheral portion thereof to said delivery conduit for receiving cotton and airflow from the suction generating means for impelling rotation of the impeller blade means to operate the cleaning means, axially extending agitator blade means drivingly connected to said radial impeller blade means, restrictive passage means disposed about the agitator blade means and connected to the casing means, retarding means mounted within the passage means for retarding axial movement of cotton through the passage means and aperture means disposed in the bottom of the casing means and passage means for removal of trash and debris from the cotton in response to rotation of the agitator blade means and retarded movement of cotton through the passage means.

7. The combination of claim 1, including sweep means mounted on the rotating brush means in operative relation to the collection means and the nozzle means for controlling the rate of withdrawal of cotton in accordance with the rotational speed of the brush means.

8. In a cotton harvesting machine adapted to be mounted on a vehicle, stripping means movable in response to forward movement of the vehicle for stripping plants growing in rows, collecting means responsive to movement of the stripping means for positive removal and collection of stripped plant material from the stripping means, power operated pressure generating means, conveying means operatively connecting said generating means to the collecting means for restrictive exposure of the plant material to pressure produced by the generating means to induce flow of plant material from the collection means, and flow operated cleaning means rendered operative in response to said flow for removing debris from the plant material transferred thereto by the pressure generating means, said collection means comprising, baffle means operatively mounted in relatively moving relation to the stripping means for accumulating plants thereon from the stripping means, and restrictive passage means formed in the stripping means to establish fluid communication between the baffle means and the conveying means for said restrictive exposure of the plant material.

9. The combination of claim 8 wherein said cleaning means comprises, impeller means rotatable in response to discharge flow from the pressure generating means, conduit means for conducting restrictive flow of plant material under pressure from the impeller means, and agitator means mounted within said conduit means and driven by the impeller means for separating the debris from the plant material, said conduit means having spaced openings therein through which the debris is discharged as the plant material is conducted therethrough.

10. In a cotton harvesting machine adapted to be mounted on a vehicle, stripping means movable in response to forward movement of the vehicle for stripping plants growing in rows, collecting means responsive to movement of the stripping means for positive removal and collection of stripped plant material from the stripping means, power operated pressure generating means, conveying means operatively connecting said generating means to the collecting means for restrictive exposure of the plant material to pressure produced by the generating means to induce flow of plant material from the collection means, and flow operated cleaning means rendered operative in response to said flow for removing debris from the plant material transferred thereto by the pressure generating means, said cleaning means comprising, impeller means rotatable in response to discharge flow from the pressure generating means, conduit means for conducting restrictive flow of plant material under pressure from the impeller means, and agitator means mounted within said conduit means and driven by the impeller means for separating the debris from the plant material, said conduit means having spaced openings therein through which the debris is discharged as the plant material is conducted therethrough.

References Cited in the file of this patent

UNITED STATES PATENTS

| | | |
|---|---|---|
| 1,763,607 | Watkins | June 10, 1930 |
| 2,001,079 | Court | May 14, 1935 |
| 2,064,394 | Thomann | Dec. 15, 1936 |
| 2,475,531 | Townsend | July 5, 1949 |
| 2,518,465 | Hagen et al. | Aug. 15, 1950 |
| 2,667,023 | Ellis et al. | Jan. 26, 1954 |
| 2,668,330 | Gieszl | Feb. 9, 1954 |
| 2,672,719 | Wagnon | Mar. 23, 1954 |
| 2,702,976 | Diserens | Mar. 1, 1955 |
| 2,760,325 | Witt | Aug. 28, 1956 |